United States Patent
Zhu (10) Patent No.: US 11,586,248 B2
(45) Date of Patent: Feb. 21, 2023

(54) DISPLAY DEVICE AND METHOD OF MANUFACTURING SAME

(71) Applicant: Wuhan China Star Optoelectronics Semiconductor Display Technology Co., Ltd., Wuhan (CN)

(72) Inventor: Cuilin Zhu, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 16/641,858

(22) PCT Filed: Dec. 4, 2019

(86) PCT No.: PCT/CN2019/122999
§ 371 (c)(1),
(2) Date: Feb. 25, 2020

(87) PCT Pub. No.: WO2021/031452
PCT Pub. Date: Feb. 25, 2021

(65) Prior Publication Data
US 2022/0171432 A1 Jun. 2, 2022

(30) Foreign Application Priority Data
Aug. 19, 2019 (CN) .......................... 201910764120.1

(51) Int. Cl.
*G06F 1/16* (2006.01)
*B32B 27/28* (2006.01)
(Continued)

(52) U.S. Cl.
CPC .......... *G06F 1/1652* (2013.01); *B32B 27/281* (2013.01); *B32B 37/1207* (2013.01);
(Continued)

(58) Field of Classification Search
CPC ........... G06F 1/16; B32B 27/28; B32B 38/00; B32B 37/12
See application file for complete search history.

(56) References Cited

U.S. PATENT DOCUMENTS

| 2014/0140037 A1 | 5/2014 | Cho |
| 2017/0263492 A1 | 9/2017 | Son et al. |

(Continued)

FOREIGN PATENT DOCUMENTS

| CN | 103824526 A | 5/2014 |
| CN | 107425016 A | 12/2017 |

(Continued)

OTHER PUBLICATIONS

Machine_English_TRanslation_of_CN_108597380_A; Wang, Q.; Display Panel; Sep. 28, 2018; EPO; whole document (Year: 2018).*

(Continued)

*Primary Examiner* — Tahseen Khan
(74) *Attorney, Agent, or Firm* — PV IP PC; Wei Te Chung; Ude Lu (57) ABSTRACT

A display device is provided. A support component is provided in the display device, and the support component is provided in a bent part of the display device. The support component is configured to support the display device. When the display device is subjected to an external force, a bending space and a bending area can maintain shapes because of an existence of the support component. This improves issues of circuit breakage in the bending area of the display device and improves reliability of the display device.

20 Claims, 5 Drawing Sheets

(51) Int. Cl.
*B32B 38/00* (2006.01)
*B32B 37/12* (2006.01)
(52) U.S. Cl.
CPC ...... *B32B 38/0036* (2013.01); *B32B 2307/51* (2013.01); *B32B 2377/00* (2013.01); *B32B 2457/20* (2013.01)

(56) References Cited

U.S. PATENT DOCUMENTS

| | | | |
|---|---|---|---|
| 2017/0338437 A1 | 11/2017 | Watabe et al. | |
| 2018/0180911 A1* | 6/2018 | Odaka | H01L 51/5293 |
| 2021/0337682 A1* | 10/2021 | Zhu | G06F 1/1652 |

FOREIGN PATENT DOCUMENTS

| | | | | | |
|---|---|---|---|---|---|
| CN | 108597380 A | * | 9/2018 | ............ | G09F 9/301 |
| CN | 108597380 A | | 9/2018 | | |
| CN | 109062439 A | * | 12/2018 | ............ | G06F 3/041 |
| CN | 109272874 A | | 1/2019 | | |
| CN | 208488918 U | | 2/2019 | | |
| CN | 208488920 U | | 2/2019 | | |
| CN | 208488923 U | | 2/2019 | | |
| CN | 109410767 A | * | 3/2019 | ........... | G06F 1/1652 |
| CN | 109410767 A | | 3/2019 | | |
| CN | 109461382 A | | 3/2019 | | |
| CN | 109616021 A | | 4/2019 | | |
| JP | 2019053205 A | | 4/2019 | | |
| KR | 20190078842 A | | 7/2019 | | |

OTHER PUBLICATIONS

Machine_English_TRanslation_of_CN_109062439_A; Mao, J.; Display Panel and Display Device; Aug. 9, 2018; EPO; whole document (Year: 2018).*

* cited by examiner

DISPLAY DEVICE AND METHOD OF MANUFACTURING SAME

FIELD OF INVENTION

The present disclosure relates to the field of display technologies, and more particularly to a display device and a method of manufacturing the same.

BACKGROUND OF INVENTION

In a modern communications industry, a market demand for mobile phones, televisions, tablets, notebooks, digital cameras, and other products is increasing. Various display devices are also developing to be bendable. In manufacture of flexible full-screen display modules, a bending process must be used. At present, an arc structure of a product structure is unstable after bending. If an arc is squeezed by external force, it may easily cause risks such as arc deformation and line breakage in a bending area, reducing reliability of the display device.

SUMMARY OF INVENTION

Aiming at display devices in the prior art, when external force is applied, it is easy to cause issues such as deformation of a bending area and line breakage, etc., a display device and a method of manufacturing the same of the present invention are proposed.

In a first aspect, the present application provides a display device, comprising: a back plate comprising a first back plate and a second back plate; a display panel comprising a first non-bending area and a second non-bending area, wherein the first non-bending area is defined above the first back plate, and the second non-bending area is defined above the second back plate, a bending area is defined between the first non-bending area and the second non-bending area, and a bending space is defined among the bending area, the first back plate, and the second back plate; an organic film layer disposed above the back plate, wherein the organic film layer connects the first non-bending area and the second non-bending area, a surface of the organic film layer close to the back plate is provided with at least one groove, and the organic film layer is in a bent state; and a support component disposed in the bending space, wherein the support component is provided with at least one convex part, the at least one convex part is arranged corresponding to the at least one groove on the organic film layer in number, shape, and position, the at least one convex part is meshed with the at least one groove, and the support component is configured to support the bending space.

Optionally, the display device further comprises a thermosetting adhesive layer configured to protect the bending area, wherein the thermosetting adhesive layer is disposed above the organic film layer.

Optionally, material of the support component comprises a thermosetting adhesive, a photosensitive adhesive, or a silicone.

Optionally, a depth of the at least one groove is less than a thickness of the organic film layer.

Optionally, a depth of the at least one groove is one third of the thickness of the organic film layer.

Optionally, a shape of the at least one groove comprises a spur gear, a circular arc, or a trapezoid.

Optionally, the at least one convex part is plural, and the at least one convex part is arranged corresponding to the at least one groove on the organic film layer in number, shape, and position.

Optionally, the support component is a special-shaped stiffener.

Optionally, material of the special-shaped stiffener comprises metal, rubber, or plastic.

Optionally, the display device further comprises a stiffener disposed between the first back plate and the second back plate, and the stiffener is configured to connect the first back plate and the second back plate.

Optionally, the organic film layer is a polyimide film layer.

In a second aspect, the present application provides a method of manufacturing a display device, comprising: providing a back plate, wherein the back plate comprises a first back plate and a second back plate; providing a display panel, wherein the display panel comprises a first non-bending area and a second non-bending area, the first non-bending area is defined above the first back plate, the second non-bending area is defined above the second back plate, and a bending area is defined between the first non-bending area and the second non-bending area; forming an organic film layer above the back plate, wherein the organic film layer connects the first back plate and the second back plate, a surface of the organic film layer close to the back plate is provided with at least one groove, and the organic film layer is in a bent state; and forming a support component in the bending area configured to support a bending space, wherein the support component is provided with at least one convex part, and the at least one convex part matches the at least one groove on the organic film layer.

Optionally, forming the support component in the bending area configured to support the bending space comprises: coating a thermosetting material on a side of the bending area close to the back plate; bending the bending area of the coated thermosetting material in a direction close to the back plate; and heating the bending area after the bending is completed, such that the thermosetting material is solidified to form the support component configured to support the bending area.

Optionally, the thermosetting material is a thermosetting adhesive.

Optionally, forming the support component in the bending area configured to support the bending space comprises: before bending the display panel, arranging the support component on a side of the display panel close to the organic film layer in advance; and bending the display panel and filling the support component in the bending space.

Optionally, forming the support component in the bending area configured to support the bending space comprises: providing a support member, wherein the support member comprises the support component and an introduction member disposed at another end of the support component; introducing the support component into the bending space through the introduction member; and peeling the introduction member from the support member and retaining the support component filled in the bending space.

Optionally, the introduction member has a convex semi-cylindrical shape.

Optionally, the organic film layer is a polyimide film layer.

Optionally, a depth of the at least one groove is less than a thickness of the organic film layer.

Optionally, a shape of the at least one groove comprises a spur gear, a circular arc, or a trapezoid.

Beneficial effects of the present invention: the present invention provides a new display device. The display device comprises a bending area and a bending space. By providing a support component in the bending space, when the display device is subjected to an external force, the bending space and the bending area can maintain shapes because of an existence of the support component. This improves issues of circuit breakage in the bending area of the display device and improves reliability of the display device.

DESCRIPTION OF DRAWINGS

In order to explain technical solutions in embodiments or the prior art more clearly, drawings used in the description of the embodiments or the prior art will be briefly introduced below. Obviously, the drawings in the following description are only some embodiments of the present invention. For those of ordinary skill in the art, other drawings can be obtained based on the drawings without paying creative efforts.

DETAILED DESCRIPTION OF PREFERRED EMBODIMENTS

The following descriptions of the embodiments are made with reference to the attached drawings to illustrate specific embodiments in which the present invention can be implemented. Directional terms used in the present invention, such as "upper", "lower", "front", "rear", "left", "right", "inside", "outside", "side", etc. are only directions referring to the attached drawings. Therefore, the directional terms used are for explaining and understanding the present invention, but not for limiting the present invention. In the figures, similarly structured units are denoted by the same reference numerals.

The drawings and description are to be regarded as illustrative in nature and not restrictive. In the figures, similarly structured units are denoted by the same reference numerals. In addition, for understanding and ease of description, the size and thickness of each component shown in the drawings are arbitrarily shown, but the present invention is not limited thereto.

In the figures, thicknesses of layers, films, panels, regions, etc. are exaggerated for clarity. In the figures, thicknesses of some layers and regions are exaggerated for the convenience of understanding and description. It should be noted that when a component such as a layer, film, region, or substrate is referred to as being "on" another component. The component may be directly on the other component, or there may be an intermediate component.

In addition, in the specification, unless explicitly described to the contrary, the word "comprising" will be understood to mean including the recited component, but not excluding any other components. In addition, in the specification, "on" means to be above or below the target component and does not mean that it must be on top based on the direction of gravity.

In order to further explain the predetermined technical means and effects adopted by the present invention, the following describes a display device and a manufacturing method thereof according to the present invention with reference to the drawings and preferred embodiments. Specific implementations, structures, features, and its effect are explained in detail as follows.

In the prior art, a flexible screen must use a bending process in a manufacturing process of a display module. This makes current products unstable in a bending area structure. If a bending area is squeezed by external force, it is easy to cause issues such as deformation of the bending area and line breakage, which greatly reduces product reliability.

Figure 1:
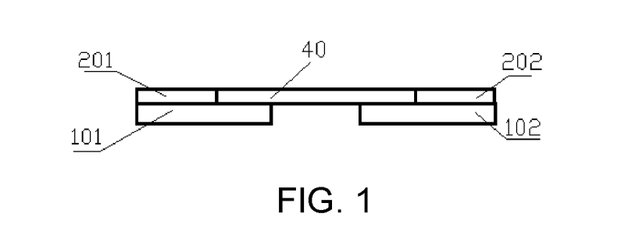
FIG. 1 is a schematic structural diagram when a display device is not bent according to an embodiment of the present invention.

An embodiment of the present application provides a display device. Referring to FIG. 1, which is a schematic structural diagram when a display device is not bent according to an embodiment of the present invention. The display device comprises a back plate 10 comprising a first back plate 101 and a second back plate 102; a display panel 20 comprising a first non-bending area 201 and a second non-bending area 202, wherein the first non-bending area 201 is defined above the first back plate 101, and the second non-bending area 202 is defined above the second back plate 102, a bending area is defined between the first non-bending area 201 and the second non-bending area 202, and a bending space 30 is defined among the bending area, the first back plate 101, and the second back plate 102; an organic film layer 40 disposed above the back plate 10, wherein the organic film layer 40 connects the first non-bending area 201 and the second non-bending area 202, a surface of the organic film layer 40 close to the back plate 10 is provided with at least one groove, and the organic film layer 40 is in a bent state; and a support component 50 disposed in the bending space 30, wherein the support component 50 is provided with at least one convex part, the at least one convex part is arranged corresponding to the at least one groove on the organic film layer 40 in number, shape, and position, the at least one convex part is meshed with the at least one groove, and the support component is configured to support the bending space 30.

In the display device according to an embodiment of the present application, by providing a support component in the bending space of the display device, when the display device is subjected to an external force, the bending space and the bending area can maintain shapes because of an existence of the support component. This improves issues of circuit breakage in the bending area of the display device and improves reliability of the display device.

Figure 2:
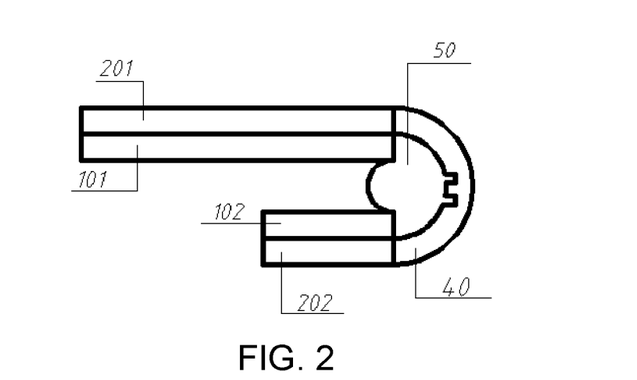
FIG. 2 is a schematic structural diagram according to an embodiment of the present invention.

Referring to FIG. 2, which is a schematic structural diagram according to an embodiment of the present invention. In details, the display panel 20 comprises a first non-bending area 201 and a second non-bending area 202. The first non-bending area 201 is defined above the first back plate 101, and the first back plate 101 is configured to carry the first non-bending area 201. The second non-bending area 202 is defined above the second back plate 102, and the second back plate 201 is configured to carry the second non-bending area 202. A bending area is defined between the first non-bending area 201 and the second non-bending area 202, and a bending space 30 is defined among the bending area, the first back plate 101, and the second back plate 102. The support component 50 is disposed in the bending space 30 to support the display device.

Figure 3:
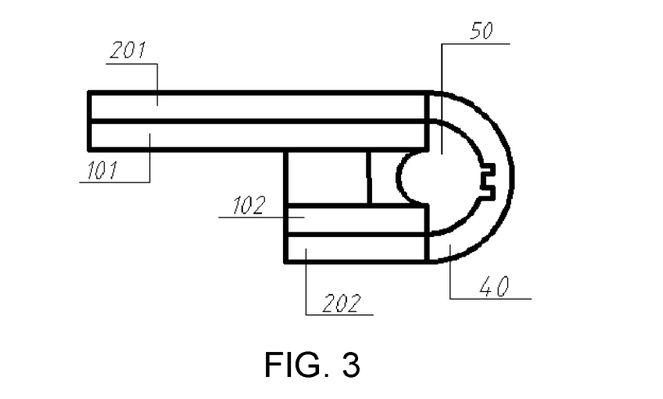
FIG. 3 is a schematic structural diagram according to another embodiment of the present invention.

Referring to FIG. 3, which is a schematic structural diagram of a display device according to another embodiment of the present invention. The display device may further include a stiffener.

Specifically, after the display panel is bent, the second back plate 102 and the second non-bending area 202 are located below the first back plate 101 and the first non-bending area 201. Since there are other structures such as gate lines and a source and drain layer in the display panel, there will be a certain distance between the first back plate 101 and the second back plate 102. A stiffener is disposed between the first back plate 101 and the second back plate 102. The stiffener is used to connect the first back plate 101 and the second back plate 102. The stiffener itself is relatively hard. When the display device is subjected to an external force, it is difficult to deform due to the presence of the stiffener, so as to ensure that structures of the first back plate 101 and the second back plate 102 remain stable.

The display device further includes the organic film layer 40. The organic film layer 40 is disposed above the back plate 10 and is used to connect the first back plate 101 and the second back plate 102. The organic film layer 40 is made of a bendable material. The organic film layer 40 is bent, so that the organic film layer 40 is in a bent state. The bending space 30 is formed among the bent organic film layer 40, the first back plate 101, and the second back plate 102.

Specifically, the organic film layer 40 may be a polyimide film.

Figure 4:
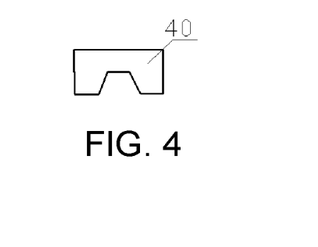
FIG. 4 is an enlarged schematic diagram of an organic film layer structure according to an embodiment of the present invention.

Referring to FIG. 4, which is an enlarged schematic diagram of an organic film layer structure provided by an embodiment of the present invention. In some embodiments of the present invention, the organic film layer 40 is provided with at least one groove. Specifically, there may be one or more grooves on the organic film layer 40.

In the embodiment of the present invention, the support component 50 is disposed in the bending space 30 to support the display panel. The support component 50 is provided with at least one convex part. Specifically, there may be one or more convex parts on the support component 50.

It should be noted that number, shape, and position of the grooves on the organic film layer 40 correspond to the convex parts on the support component 50 in a one-to-one correspondence. This allows the grooves on the organic film layer 40 to be engaged with the convex parts on the support component 50, which can better support the bending area of the display panel. This makes it possible to maintain the shape when the bending area is squeezed by external force, which improves issues of line breakage in the bending area.

Specifically, the groove on the organic film layer 40 may be one, and the convex part on the support component 50 may also correspond to one. The groove on the organic film layer 40 and the convex part on the support component 50 are engaged with each other. There may also be a plurality of grooves on the organic film layer 40 and correspondingly a plurality of convex parts on the support component 50. The grooves on the organic film layer 40 and the convex parts on the support component 50 are engaged with each other. When there are a plurality of grooves on the organic film layer 40, the plurality of grooves are uniformly distributed on the organic film layer, and the convex parts on the support component are correspondingly provided with the grooves.

In the above embodiment, a depth of the groove is less than a thickness of the organic film layer 40. Specifically, the depth of the groove may be one third of the thickness of the organic film layer 40. Therefore, the groove can be better engaged with the convex part, so that the support component can better support the display device.

Specifically, a shape of the groove may be a spur gear, an arc, or a trapezoid. A shape of the convex part is corresponding to that of the groove, so that the groove and the convex part are engaged together.

In the embodiment of the present invention, the method of manufacturing the groove includes, but is not limited to, laser etching. For specific operation steps, refer to the prior art, which is not limited herein.

Figure 5:
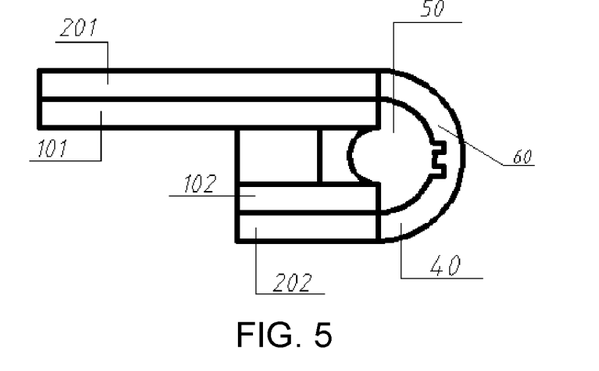
FIG. 5 is a schematic structural diagram according to another embodiment of the present invention.

Referring to FIG. 5, which is a schematic structural diagram according to another embodiment of the present invention. The display device further includes a thermosetting adhesive layer 60 configured to protect the bending area. The thermosetting adhesive layer is disposed above the organic film layer 40. The thermosetting adhesive layer is made of a bendable material, and is in a bent state like the organic film layer 40 to protect the bending area.

In some embodiments of the present invention, a material of the support component 50 may include a thermosetting adhesive, a photosensitive adhesive, or a silicone.

Specifically, when the material of the support component 50 comprises a photoresist adhesive, curing principle of the photoresist is that a photoinitiator (or photosensitizer) in photoresist curing material absorbs ultraviolet light under ultraviolet radiation to generate active radicals or cations. This triggers monomer polymerization and cross-linking chemical reactions, so that the photosensitive adhesive can be quickly converted from a liquid state to a solid state.

In an embodiment of the present invention, a cross section of the bending space 30 comprises a semi-cylindrical shape having a groove. A cross-sectional view of the support component 50 comprises a semi-cylindrical shape having a convex part. A cross-sectional radius of the support component 50 is R. The cross-sectional radius R is not smaller than a cross-sectional radius of the bending space 30, that is, not smaller than a bending radius of the bending space. In this way, the support component 50 can fully support the bending space 30 and can effectively help the bending space 30 to relieve external force when the bending space 30 receives the external force. After the support component 50 is fully inserted into the bending space 30, since the support component 50 is provided with the convex parts and corresponding grooves are defined on the organic film layer, the convex parts and the grooves mesh with each other like gears. Therefore, the support component 50 is fixed in the bending space 30 for supporting the bending space 30.

Figure 6:
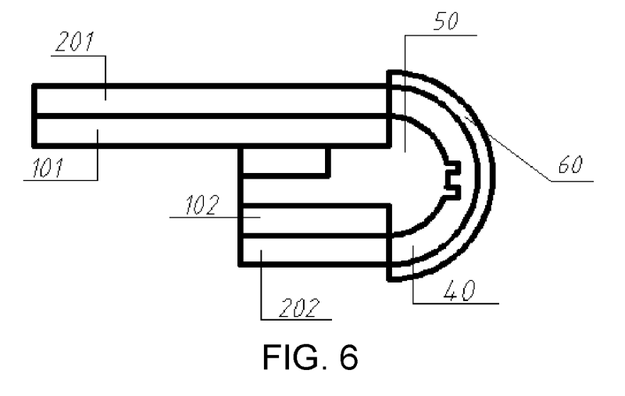
FIG. 6 is a schematic structural diagram according to another embodiment of the present invention.

In another embodiment of the present invention, referring to FIG. 6, which is a schematic structural diagram according to another embodiment of the present invention. The support component 50 may also be a special-shaped stiffener. Specifically, the special-shaped stiffener includes a first part and a second part. A cross section of the first part of the special-shaped stiffener includes a semi-cylindrical structure, and a convex part is disposed on a surface of the first part of the special-shaped stiffener. Shape, size, and number of the convex parts correspond to the grooves on the organic film layer. This makes the convex parts on the special-shaped stiffener mesh with the grooves on the organic film layer, so that the special-shaped stiffener is better fixed in the bending space 30.

Material of the stiffener is relatively hard. When the display device is subjected to external force, the display device is difficult to deform due to existence of the stiffener.

In addition, the second part of the special-shaped stiffener is located between the first back plate 101 and the second back plate 102 and is used to connect the first back plate 101 and the second back plate 102. This makes it more difficult for the display device to deform when subjected to an external force.

In the above embodiment of the present invention, material of the stiffener includes metal, rubber, or plastic.

Figure 7:
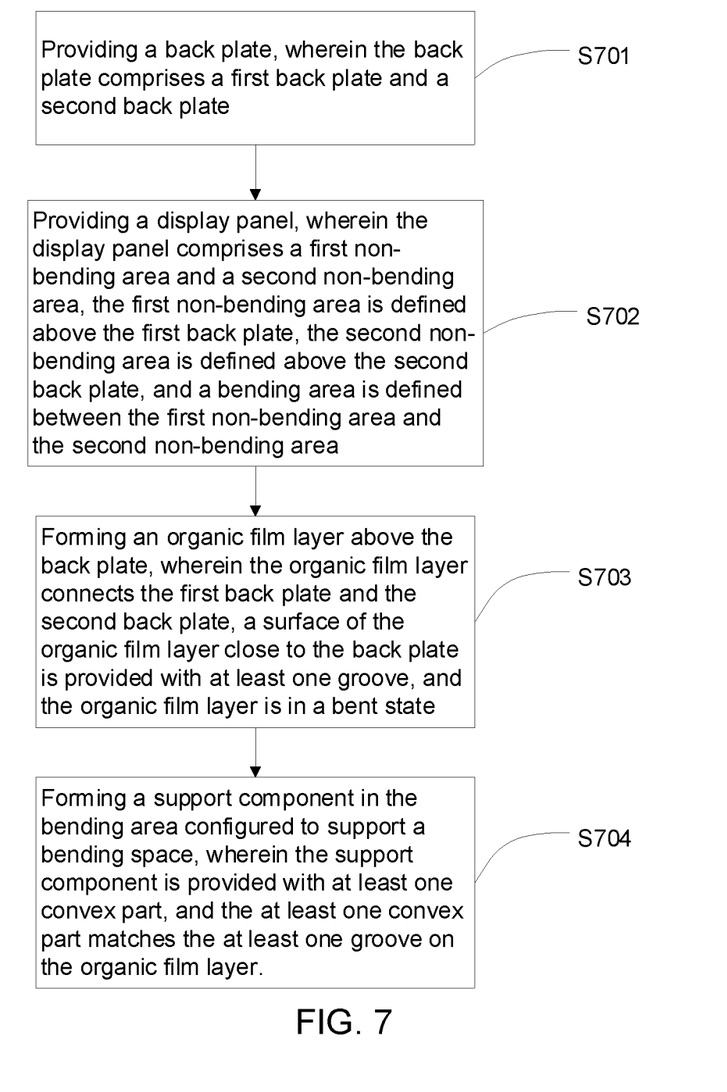
FIG. 7 is a schematic flowchart of a method of manufacturing a display device according to an embodiment of the present invention.

An embodiment of the present invention also provides a method of manufacturing a display device. Referring to FIG. 7, which is a schematic flowchart of a method of manufacturing a display device according to an embodiment of the present invention. The method includes as follows.

S701, providing a back plate, wherein the back plate comprises a first back plate and a second back plate.

S702, providing a display panel, wherein the display panel comprises a first non-bending area and a second non-bending area, the first non-bending area is defined above the first back plate, the second non-bending area is defined above the second back plate, and a bending area is defined between the first non-bending area and the second non-bending area.

S703, forming an organic film layer above the back plate, wherein the organic film layer connects the first back plate and the second back plate, a surface of the organic film layer close to the back plate is provided with at least one groove, and the organic film layer is in a bent state.

S704, forming a support component in the bending area configured to support a bending space, wherein the support component is provided with at least one convex part, and the at least one convex part matches the at least one groove on the organic film layer.

In method of manufacturing of the display device according to an embodiment of the present application, by providing a support component in the bending space of the display device, when the display device is subjected to an external force, the bending space and the bending area can maintain shapes because of an existence of the support component. This improves issues of circuit breakage in the bending area of the display device and improves reliability of the display device.

In some embodiments of the present invention, step S4 of forming the support component in the bending area configured to support the bending space comprises: before bending the display panel, arranging the support component 50 on a side of the display panel close to the organic film layer 40 in advance; and bending the display panel and then filling the support component 50 in the bending space 30.

Figure 8:
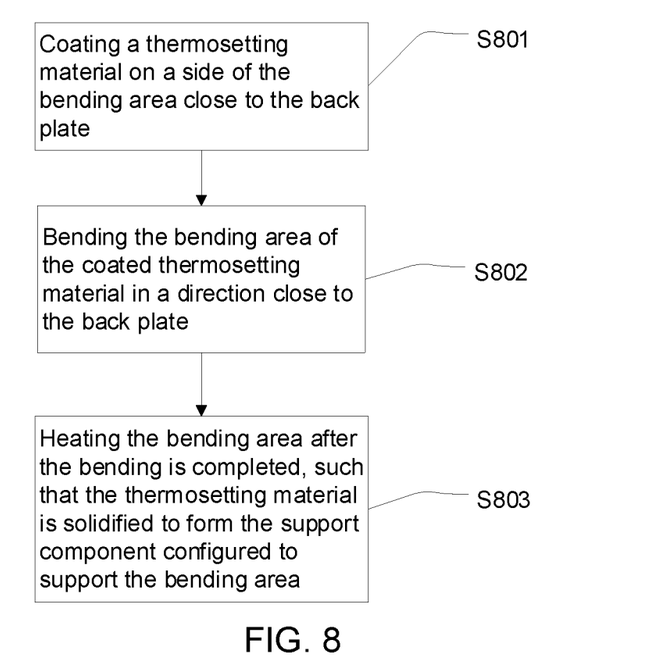
FIG. 8 is a schematic flowchart of step S4 of a method of manufacturing a display device according to an embodiment of the present invention.

In details, referring to FIG. 8, which is a schematic flowchart of step S4 of a method of manufacturing a display device according to an embodiment of the present invention. The step S4 of forming the support component in the bending area configured to support the bending space comprises as follows.

S801, coating a thermosetting material on a side of the bending area close to the back plate.

The thermosetting material is in a gel state at room temperature and will not affect subsequent bending. At a certain temperature, the thermosetting material solidifies and can support the bending area.

Specifically, the thermosetting material may be a thermosetting adhesive.

S802, bending the bending area of the coated thermosetting material in a direction close to the back plate.

After the bending space is formed in the bending area of the display panel, since the thermosetting material has fluidity at a normal temperature state, the thermosetting material is distributed inside the entire bending space.

S803, heating the bending area after the bending is completed, such that the thermosetting material is solidified to form the support component configured to support the bending area.

Figure 9:
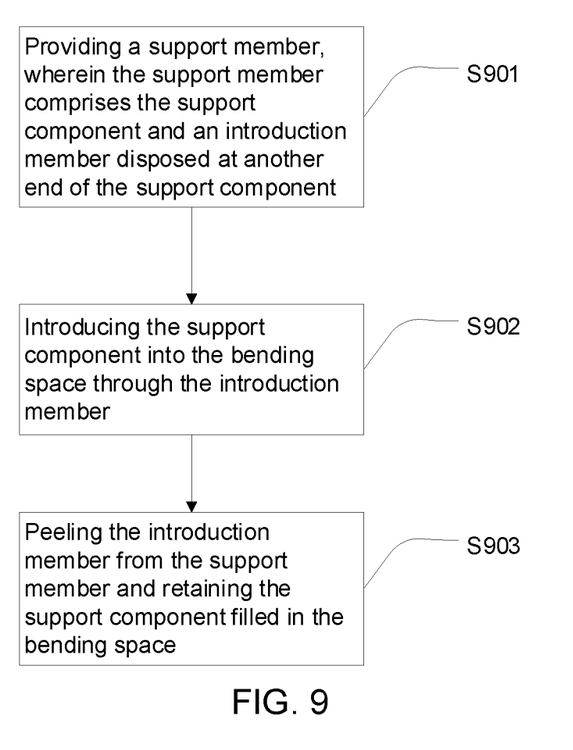
FIG. 9 is a schematic flowchart of step S4 of a method of manufacturing a display device according to another embodiment of the present invention.

In other embodiments of the present invention, referring to FIG. 9, which is a schematic flowchart of step S4 of a method of manufacturing a display device according to another embodiment of the present invention. The following method can also be used to fill the support component 50 into the bending space.

S901, providing a support member, wherein the support member comprises the support component 50 and an introduction member disposed at another end of the support component 50.

S902, introducing the support component 50 into the bending space through the introduction member.

S903, peeling the introduction member from the support member and retaining the support component filled in the bending space.

In details, in the above embodiment, the introduction member has a convex semi-cylindrical shape, and its cross-sectional diameter is smaller than a cross-sectional radius of the bending space 30, so that the introduction member can be inserted into the bending space 30.

After the introduction member is inserted into the bending space 30, the support component 50 can be pushed into the bending space 30 until the support component 50 is completely submerged into the bending space 30, then the introduction member is peeled off, leaving only the support component 50.

According to the above object of the present invention, a display device is provided, which includes the display device obtained by a method of manufacturing the display device described above. The working principle of the display device provided in this embodiment is consistent with the working principle of the foregoing embodiment of the method of manufacturing the display device. For specific structural relationship and working principle, refer to the foregoing embodiment of the method of manufacturing the display device, and details are not described herein again.

In summary, although the present invention has been disclosed as above with preferred embodiments, the above preferred embodiments are not intended to limit the present invention. Those skilled in the art can make various modifications and retouching without departing from the spirit and scope of the present invention. Therefore, the protection scope of the present invention is subject to the scope defined by the claims.

What is claimed is:

1. A display device, comprising:
a back plate comprising a first back plate and a second back plate;
a display panel comprising a first non-bending area and a second non-bending area, wherein the first non-bending area is defined above the first back plate, and the second non-bending area is defined above the second back plate, a bending area is defined between the first non-bending area and the second non-bending area, and a bending space is defined among the bending area, the first back plate, and the second back plate;
an organic film layer disposed above the back plate, wherein the organic film layer connects the first non-bending area and the second non-bending area, a surface of the organic film layer close to the back plate is provided with at least one groove, and the organic film layer is in a bent state; and a support component disposed in the bending space, wherein the support component is provided with at least one convex part, the at least one convex part is arranged corresponding to the at least one groove on the organic film layer in number, shape, and position, the at least one convex part is meshed with the at least one groove, and the support component is configured to support the bending space.

2. The display device according to claim 1, further comprising a thermosetting adhesive layer configured to protect the bending area, wherein the thermosetting adhesive layer is disposed above the organic film layer.

3. The display device according to claim 1, wherein material of the support component comprises a thermosetting adhesive, a photosensitive adhesive, or a silicone.

4. The display device according to claim 1, wherein a depth of the at least one groove is less than a thickness of the organic film layer.

5. The display device according to claim 4, wherein a depth of the at least one groove is one third of the thickness of the organic film layer.

6. The display device according to claim 1, wherein a shape of the at least one groove comprises a spur gear, a circular arc, or a trapezoid.

7. The display device according to claim 1, wherein the at least one convex part is plural, and the at least one convex part is arranged corresponding to the at least one groove on the organic film layer in number, shape, and position.

8. The display device according to claim 1, wherein the support component is a special-shaped stiffener.

9. The display device according to claim 8, wherein material of the special-shaped stiffener comprises metal, rubber, or plastic.

10. The display device according to claim 1, further comprising a stiffener disposed between the first back plate and the second back plate, wherein the stiffener is configured to connect the first back plate and the second back plate.

11. The display device according to claim 1, wherein the organic film layer is a polyimide film layer.

12. A method of manufacturing a display device, comprising:
providing a back plate, wherein the back plate comprises a first back plate and a second back plate;
providing a display panel, wherein the display panel comprises a first non-bending area and a second non-bending area, the first non-bending area is defined above the first back plate, the second non-bending area is defined above the second back plate, and a bending area is defined between the first non-bending area and the second non-bending area;
forming an organic film layer above the back plate, wherein the organic film layer connects the first back plate and the second back plate, a surface of the organic film layer close to the back plate is provided with at least one groove, and the organic film layer is in a bent state; and
forming a support component in the bending area configured to support a bending space, wherein the support component is provided with at least one convex part, and the at least one convex part matches the at least one groove on the organic film layer.

13. The method of manufacturing the display device according to claim 12, wherein forming the support component in the bending area configured to support the bending space comprises:
coating a thermosetting material on a side of the bending area close to the back plate;
bending the bending area of the coated thermosetting material in a direction close to the back plate; and
heating the bending area after the bending is completed, such that the thermosetting material is solidified to form the support component configured to support the bending area.

14. The method of manufacturing the display device according to claim 13, wherein the thermosetting material is a thermosetting adhesive.

15. The method of manufacturing the display device according to claim 12, wherein forming the support component in the bending area configured to support the bending space comprises:
before bending the display panel, arranging the support component on a side of the display panel close to the organic film layer in advance; and
bending the display panel and filling the support component in the bending space.

16. The method of manufacturing the display device according to claim 12, wherein forming the support component in the bending area configured to support the bending space comprises:
providing a support member, wherein the support member comprises the support component and an introduction member disposed at another end of the support component;
introducing the support component into the bending space through the introduction member; and
peeling the introduction member from the support member and retaining the support component filled in the bending space.

17. The method of manufacturing the display device according to claim 16, wherein the introduction member has a convex semi-cylindrical shape.

18. The method of manufacturing the display device according to claim 12, wherein the organic film layer is a polyimide film layer.

19. The method of manufacturing the display device according to claim 17, wherein a depth of the at least one groove is less than a thickness of the organic film layer.

20. The method of manufacturing the display device according to claim 12, wherein a shape of the at least one groove comprises a spur gear, a circular arc, or a trapezoid.

* * * * *